United States Patent
Yang et al.

(10) Patent No.: US 10,355,811 B2
(45) Date of Patent: Jul. 16, 2019

(54) DISPLAY DEVICE AND SYSTEM AND METHOD FOR DISPLAYING CONTENTS USING THE SAME

(71) Applicant: Samsung Display Co., Ltd., Yongin-si, Gyeonggi-Do (KR)

(72) Inventors: Jung Jin Yang, Yongin-si (KR); Mu Gyeom Kim, Yongin-si (KR); Keun Tae Jung, Yongin-si (KR)

(73) Assignee: Samsung Display Co., Ltd. (KR)

( * ) Notice: Subject to any disclaimer, the term of this patent is extended or adjusted under 35 U.S.C. 154(b) by 23 days.

(21) Appl. No.: 15/636,946

(22) Filed: Jun. 29, 2017

(65) Prior Publication Data

US 2018/0006762 A1 Jan. 4, 2018

(30) Foreign Application Priority Data

Jun. 30, 2016 (KR) ........................ 10-2016-0083063

(51) Int. Cl.
| | |
|---|---|
| *H04L 1/00* | (2006.01) |
| *H04L 12/24* | (2006.01) |
| *H04L 29/08* | (2006.01) |
| *G07F 17/32* | (2006.01) |
| *G06F 8/65* | (2018.01) |

(52) U.S. Cl.
CPC ........ *H04L 1/0004* (2013.01); *G07F 17/3211* (2013.01); *H04L 41/082* (2013.01); *H04L 67/36* (2013.01); *G06F 8/65* (2013.01); *H04L 67/2842* (2013.01)

(58) Field of Classification Search
None
See application file for complete search history.

(56) References Cited

U.S. PATENT DOCUMENTS

| | | | |
|---|---|---|---|
| 2013/0076656 A1* | 3/2013 | Sirpal | G06F 3/1438 345/173 |
| 2014/0327685 A1 | 11/2014 | Lee et al. | |
| 2015/0041792 A1* | 2/2015 | Suzuki | H01L 51/5278 257/40 |
| 2015/0348493 A1* | 12/2015 | Chae | G09G 5/00 345/212 |

FOREIGN PATENT DOCUMENTS

| | | |
|---|---|---|
| KR | 10-2007-0041199 A | 4/2007 |
| KR | 10-0704120 B1 | 4/2007 |
| KR | 10-2009-0059303 A | 6/2009 |
| KR | 10-2014-0083544 A | 7/2014 |
| KR | 10-2014-0131102 A | 11/2014 |

* cited by examiner

*Primary Examiner* — Michelle Chin
(74) *Attorney, Agent, or Firm* — Innovation Counsel LLP

(57) ABSTRACT

A display device is connected to a contents providing device via a network. The display device includes a display unit that displays contents; and a display controller that controls a contents display operation of the display unit. The display controller transmits a resolution control signal to the contents providing device, and receives contents data that is converted in response to the resolution control signal from the contents providing device.

19 Claims, 9 Drawing Sheets

DISPLAY DEVICE AND SYSTEM AND METHOD FOR DISPLAYING CONTENTS USING THE SAME

CROSS-REFERENCE TO RELATED APPLICATION

This application claims priority to and the benefit of Korean Patent Application No. 10-2016-0083063, filed on Jun. 30, 2016, in the Korean Intellectual Property Office, the disclosure of which is incorporated herein by reference in its entirety.

BACKGROUND

1. Field

The present disclosure relates to a display device and a system and a method for displaying contents using the display device.

2. Description of the Related Art

With the development of electronic technologies, various types of electronic devices have been developed and widely used for various applications. These electronic devices are equipped with various functions depending on the intended applications as well as deployment configurations and use environments.

Especially, display devices may receive various contents from content providers and reproduce the received contents. For example, some display devices may receive broadcast contents or contents from various content servers via Internet and reproduce the received contents. These display devices may communicate with various external devices to receive and reproduce contents.

As display and communication technologies advance, demands for delivery and display of high resolution contents have been increased.

In a general use environment, high resolution contents are not necessary because, users cannot distinguish between a good display quality and a poor display quality when the resolution of contents is beyond a certain level.

Further, contents of a same high resolution may be transmitted even when different use environments may require a lower resolution. In this case, the resources for generating the high-resolution contents and the communication bandwidth for delivering the high-resolution contents may be unnecessarily wasted.

SUMMARY OF THE INVENTION

The present disclosure describes a display device that is capable of using data efficiently and providing a user with contents having a display quality suitable to a use environment of the user. The present disclosure further describes a system and method for displaying contents using the display device.

In one embodiment, a contents display method includes transmitting, by a display device, a resolution control signal to a contents providing device; changing, a resolution of contents data in response to the resolution control signal and transmitting the contents data to the display device, by the contents providing device; and displaying, by the display device, the contents using the contents data.

Further, the resolution control signal may include text resolution information, image resolution information, and video resolution information.

Further, the contents data may include at least one of text data, image data, and video data.

Further, the contents providing device may change a first resolution of the text data in response to the text resolution information, change a second resolution of the image data in response to the image resolution information, and change a third resolution of the video data in response to the video resolution information.

Further, the contents display method may further include sensing whether or not a contents use environment is changed; and when it is sensed that the contents use environment is changed, transmitting a new resolution control signal that includes resolution information corresponding to a current contents use environment to the contents providing device.

Further, the contents display method may further include, when the contents providing device receives the new resolution control signal from the display device, changing the resolution of the contents data in response to the new resolution control signal, and transmitting the contents data to the display device.

Further, the step of sensing whether or not the contents use environment is changed may include sensing whether or not a display mode of the display device is changed, and the display mode may include a landscape display mode and a portrait display mode.

Further, the step of transmitting the new resolution control signal to the contents providing device may include, when the display mode of the display device is changed, transmitting the new resolution control signal that includes resolution information corresponding to the current display mode to the contents providing device.

Further, the whether or not the display mode is changed may be sensed by a motion sensor included in the display device.

Further, the motion sensor may include at least one of a gyro sensor, an acceleration sensor, and a gravity sensor.

Further, the step of sensing whether or not the contents use environment is changed may include sensing whether or not the display device enters a best resolution mode, and the step of transmitting the new resolution control signal to the contents providing device may include, when the display device enters the best resolution mode, transmitting the new resolution control signal including the best resolution information of the display device to the contents providing device.

Further, the step of sensing whether or not the contents use environment is changed may include sensing whether or not the resolution information is updated, and the step of transmitting the new resolution control signal to the contents providing device may include, when the resolution information is updated, transmitting the new resolution control signal that includes the updated resolution information to the contents providing device.

Further, the display device and the contents providing device may be connected to each other via a wireless network.

Further, the contents providing device may change the resolution of the contents data to be the same as the resolution corresponding to the resolution control signal.

Further, the contents providing device may change the resolution of the contents data to be close to the resolution corresponding to the resolution control signal, and the display device may change the resolution of the contents data to be the same as the resolution corresponding to the resolution control signal.

In another embodiment, a display system includes a contents providing device and a display device configured to transmit a resolution control signal to the contents providing device. The contents providing device changes a resolution of contents data in response to the resolution control signal, and transmits the contents data to the display device, and the display device displays the contents using the contents data.

Further, the resolution control signal may include text resolution information, image resolution information, and video resolution information.

Further, the contents data may include at least one of text data, image data, and video data.

Further, the contents providing device may change a first resolution of the text data in response to the text resolution information, change a second resolution of the image data in response to the image resolution information, and change a third resolution of the video data in response to the video resolution information.

Further, the display device may sense whether or not a contents use environment is changed, determine that the contents use environment is changed, and transmit a new resolution control signal that includes resolution information corresponding to a current contents use environment to the contents providing device.

Further, when receiving the new resolution control signal, the contents providing device may change the resolution of the contents data in response to the new resolution control signal, and transmit the contents data to the display device.

The display device may sense whether or not the display mode is changed, and the display mode may include a landscape display mode and a portrait display mode.

Further, when it is sensed that the display mode is changed, the display device may transmit the new resolution control signal that includes the resolution information corresponding to the current display mode to the contents providing device.

The contents display system may further include a motion sensor configured to detect whether or not the display mode is changed.

Further, the motion sensor may include at least one of a gyro sensor, an acceleration sensor, and a gravity sensor.

Further, the display device may sense whether or not the best resolution mode is entered, determine that the best resolution mode is entered, and transmit the new resolution control signal that includes the best resolution information of the display device to the contents providing device.

Further, the display device may sense whether or not the resolution information is updated, and when the resolution information is updated, transmit the new resolution control signal that includes the updated resolution information to the contents providing device.

Further, the display device and the contents providing device may be connected to each other via a wireless network.

Further, the contents providing device may change the resolution of the contents data to be the same as the resolution of the resolution control signal.

Further, the contents providing device may change the resolution of the contents data to be close to the resolution corresponding to the resolution control signal, and the display device may change the resolution of the contents data to be the same as the resolution corresponding to the resolution control signal.

In another embodiment, a display device is connected to a contents providing device via a network. The display device includes a display unit that displays contents and a display controller that controls a contents display operation of the display unit. The display controller transmits a resolution control signal to the contents providing device, and receives contents data in response to the resolution control signal from the contents providing device.

Further, the resolution control signal may include text resolution information, image resolution information, and video resolution information.

Further, the contents data may include at least one of text data, image data, and video data.

Further, the display controller may sense whether or not a contents use environment is changed, determine that the contents use environment is changed, and transmit a new resolution control signal that includes the resolution information corresponding to a current contents use environment to the contents providing device.

Further, the display controller may sense whether or not a display mode of the display device is changed, determine that the display mode of the display device is changed, and transmit the new resolution control signal that includes the resolution information corresponding to the current display mode to the contents providing device, and the display mode may include a landscape display mode and a portrait display mode.

The display device may further include a motion sensor that detects whether or not the display mode is changed.

Further, the motion sensor may include at least one of a gyro sensor, an acceleration sensor, and a gravity sensor.

Further, the display controller may sense whether or not the best resolution mode is entered, determine that the best resolution mode is entered, and transmit the new resolution control signal that includes the best resolution information of the display device to the contents providing device.

Further, the display controller may sense whether or not the resolution information is updated, determine that the resolution information is updated, and transmit the new resolution control signal that includes the updated resolution information to the contents providing device.

Further, the display controller may change the resolution of the contents data to be the same as the resolution corresponding to the resolution control signal.

In another embodiment, a contents display method includes transmitting, by a display device, an operational information to a contents providing device; changing a display parameter of contents data in response to the operational information and transmitting the contents data to the display device by the contents providing device; and displaying, by the display device, the contents using the contents data.

Further, the operational information may be a frame rate information, and the display parameter may be a frame rate of the contents data.

Further, the operational information may be a gray mode information, and the display parameter may be a number of bits of gray data included in the contents data.

In another embodiment, a contents display system includes: a contents providing device; and a display device configured to transmit an operational information to the contents providing device. The contents providing device changes a display parameter of contents data in response to the operational information, and transmits the contents data to the display device. The display device displays the contents using the contents data.

Further, the operational information may be a frame rate information, and the display parameter may be a frame rate of the contents data.

Further, the contents providing device may change a first frame rate of contents data in response to the frame rate information and transmit the contents data to the display device. The display device may display the contents using the contents data at a second frame rate.

Further, the operational information may be a gray mode information, and the display parameter may be a number of bits of gray data included in the contents data.

Further, the contents providing device may change a first number of bits of gray data included in the contents data in response to the frame rate information and transmit the contents data to the display device. The display device may display the contents using the contents data at a second number of bits of gray data.

According to the aforementioned embodiments of the present disclosure, it is possible to provide a display device capable of using data efficiently and providing a user with contents having a display quality suitable to the use environment of the user, and a contents display system and method using the same.

BRIEF DESCRIPTION OF THE DRAWINGS

Example embodiments will now be described more fully hereinafter with reference to the accompanying drawings; however, they may be embodied in different forms and configurations, and should not be construed as limited to the embodiments set forth herein. Rather, these embodiments are provided so that the present disclosure is thorough and complete, and fully conveys the scope of the example embodiments to those skilled in the art.

In the drawing figures, dimensions may be exaggerated for clarity of illustration. It is understood that when an element is referred to as being "between" two elements, it can be the only element between the two elements, or one or more intervening elements may also be present. Like reference numerals refer to like elements throughout the specification.

DETAILED DESCRIPTION OF THE INVENTION

Figure 1:
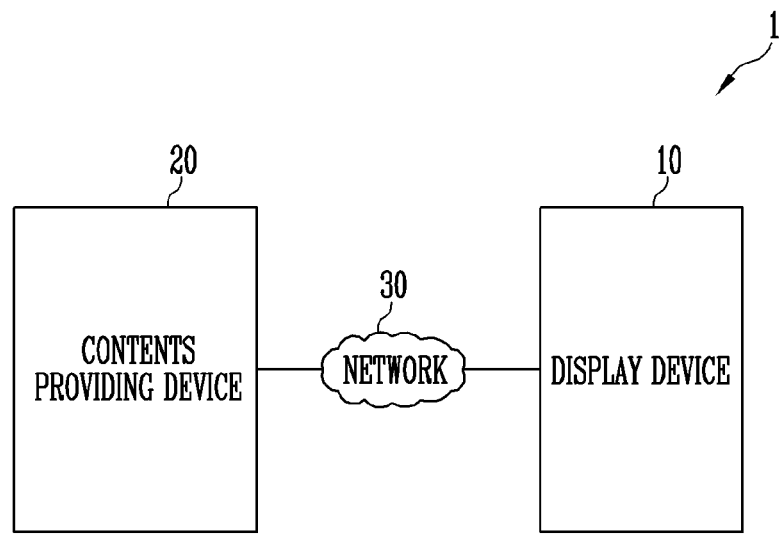
FIG. 1 is a view illustrating a contents display system, according to an embodiment of the present disclosure.

Hereinafter, exemplary embodiments of the present disclosure are described in detail with reference to the accompanying drawings. Like reference numerals principally refer to like elements throughout the specification. In the following description, when the detailed description of the relevant known function or configuration is described with reference to other embodiments or is obvious to one of ordinary skill in the art, the detailed description may be omitted. Further, a name of a constituent element used in description below may be selected in consideration of easiness of writing the specification, and thus may be different from a name of a component of an actual product.

Variations from the shapes of the illustrations as a result, for example, of manufacturing techniques and/or tolerances, are to be expected. Thus, exemplary embodiments should not be construed as limited to the particular shapes of regions illustrated herein but may include deviations in shapes that result, for example, from the manufacturing techniques and/or tolerances. In the drawings, lengths and sizes of layers and regions may be exaggerated for clarity.

Hereinafter, a display device according to an embodiment of the present disclosure and a contents display system and method using the same is explained with reference of the drawings related to the embodiments of the present disclosure.

FIG. 1 is a view illustrating a contents display system, according to an embodiment of the present disclosure.

Referring to FIG. 1, a contents display system 1 may include a display device 10 and a contents providing device 20.

The display device 10 may perform a function of receiving contents from the contents providing device 20, and displaying the contents on a screen to provide the contents to a user.

For example, the display device 10 may be one of a smartphone, a tablet personal computer, a mobile phone, an e-book reader, a desktop personal computer, a laptop personal computer, a netbook computer, a personal digital assistant (PDA), a portable multimedia player (PMP), an MP3 player, a camera, a wearable device, a television, and a navigation device.

However, the display device 10 is not limited to the aforementioned devices, that is, other devices capable of displaying contents may be adopted as the display device 10 according to an embodiment of the present disclosure.

Further, the display device 10 according an embodiment of the present disclosure may be a flexible display device.

The contents providing device 20 may perform a function of providing contents stored therein or contents received from an external device.

For example, the contents providing device 20 may be a contents providing server configured to distribute and manage contents.

Further, the contents providing device 20 may receive device-specific information (e.g., resolution information) from the display device 10, change contents data to be suitable to the device-specific information received, and transmit the changed contents data to the display device 10.

Accordingly, the contents providing device 20 may provide contents having a display quality that is suitable to the display device 10, and prevent data resources from being wasted unnecessarily.

The display device 10 and the contents providing device 20 may be mutually connected to each other via a wireless network 30.

For example, the wireless network 30 may be a communication network. The communication network may include at least one of a computer network, Internet, a wireless local area network (LAN), an Internet of things, a telephone network, and a mobile wireless communication network.

Figure 2:
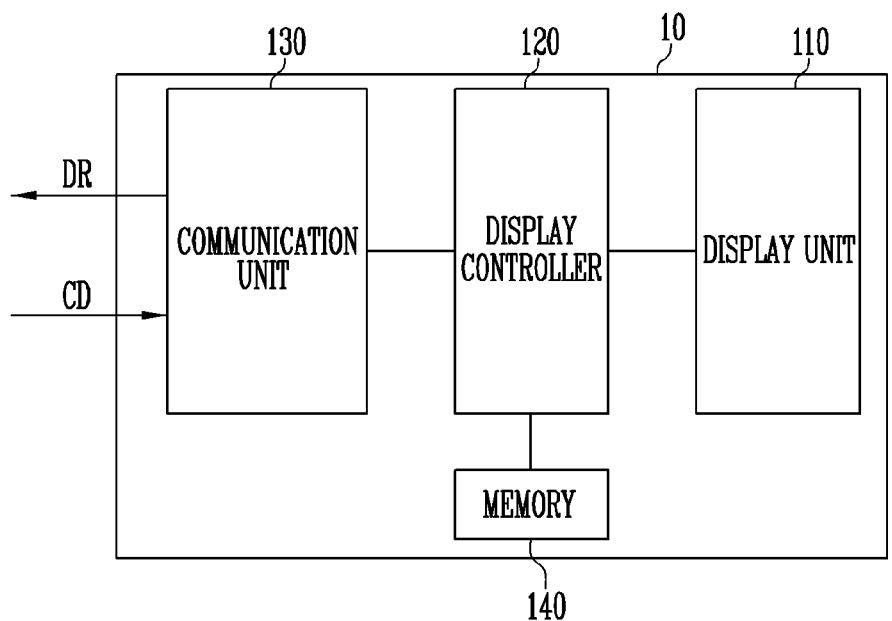
FIG. 2 is a view illustrating a display device, according to an embodiment of the present disclosure.

FIG. 2 is a view illustrating the display device, according to an embodiment of the present disclosure.

Referring to FIG. 2, the display device 10 may include a display unit 110, a display controller 120, a communication unit 130, and a memory 140.

The display unit 110 may display certain contents through a contents display area. For this purpose, the display unit 110 may include a plurality of pixels (not illustrated) located in the contents display area.

The type of the display panel included in the display unit 110 may vary. For example, the display panel may be one of an organic light emitting diode (OLED) display panel, a liquid crystal display (LCD) panel, a plasma display panel, an electrophoretic display panel, and an electro wetting display panel. However, the type of the display panel is not limited to the aforementioned.

The display controller 120 may control the display unit 110 to display contents.

For example, the display controller 120 may receive contents data CD being provided from outside (e.g., the contents providing device 20) through the communication unit 130, and control the display unit 110 such that contents corresponding to the contents data CD may be displayed on the display unit 110.

Further, the display controller 120 may transmit a resolution control signal DR to the contents providing device 20 through the communication unit 130.

The resolution control signal DR may include resolution information of the display device 10. The resolution information may include the resolution itself or information indicating one or more resolutions that the display device 10 can support.

Referring FIGS. 1 and 2, the communication unit 130 may be connected to the contents providing device 20 through the wireless network 30, and receive data (e.g., contents data CD) from the contents providing device 20, or transmit data (e.g., resolution control signal DR) to the contents providing device 20.

The resolution information included in the resolution control signal DR refers to a resolution that the current display device 10 requires, and the resolution information may be a value set by a manufacturer or a user.

Further, the resolution information included in the resolution control signal DR may be set differently per contents type (e.g., a text, an image and a video) and various use environments.

Examples of the resolution include, but are not limited to, qHD (960×540), HD (1280×720), FHD (1920×1080), 2K (2048×1080), QHD (2560×1440), WQXGA (2560×1600), UHD (3840×2160), and 4K (4096×2160).

The resolution information of the display device 10 may be stored in the memory 140. For convenience of explanation, the memory 140 and the display controller 120 are illustrated separately, but when necessary, the memory 140 may be disposed inside the display controller 120 or integrated in another component of the display device 10.

The memory 140 may include at least one of a volatile memory such as a dynamic random-access memory (DRAM), a static RAM SRAM), a synchronous DRAM (SDRAM) and a non-volatile memory such as a one-time programmable read-only memory (OTPROM), a programmable ROM (PROM), an erasable and programmable ROM (EPROM), an electrically erasable and programmable ROM (EEPROM), a mask ROM, a flash ROM, a NAND flash memory, and a NOR flash memory.

However, the type of the memory 140 is not limited to the aforementioned, that is, any memory may be adopted as the memory 140 of the present disclosure as long as it is capable of storing the resolution information of the display device 10.

Figure 3:
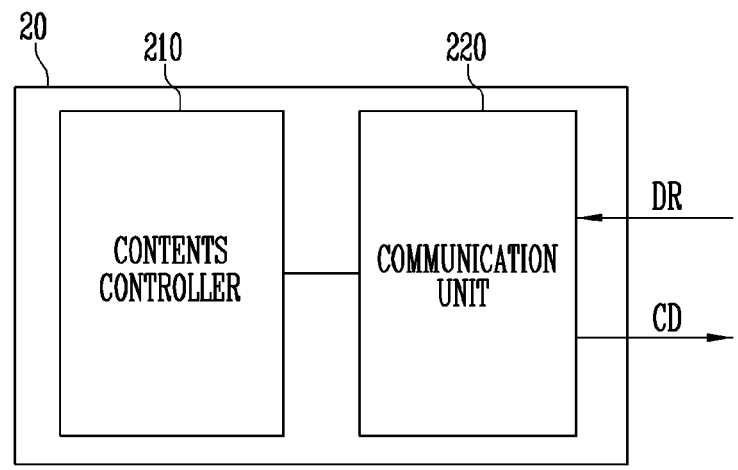
FIG. 3 is a view illustrating a contents providing device, according to an embodiment of the present disclosure.

FIG. 3 is a view illustrating the contents providing device, according to an embodiment of the present disclosure.

Referring to FIG. 3, the contents providing device 20 may include a contents controller 210 and a communication unit 220.

The contents controller 210 may receive the resolution control signal DR from the display device 10 through the communication unit 220.

The contents controller 210 may change the resolution of the contents data CD in response to the resolution control signal DR received from the display device 10, and transmit the contents data CD of which the resolution is changed according to the resolution control signal DR to the display device 10 through the communication unit 220.

In an embodiment, the contents controller 210 may change the resolution of the contents data CD to be the same as the resolution corresponding to the resolution control signal DR.

Hereinafter, operations of the contents controller 210 are explained for an exemplary cases where the resolution of the original contents data CD is "4K" (4096×2160).

In the case where the resolution required in the current display device 10 is "FHD" (1920×1080), the display controller 120 may notify that the resolution currently required is "FHD" to the contents providing device 20 by transmitting the resolution control signal DR that includes resolution information related to "FHD".

The contents controller 210 that received the resolution control signal DR may change the resolution of the contents data CD from "4K" to "FHD". Accordingly, the size of the contents data CD may be reduced.

Then, the contents controller 210 may transmit the contents data CD having the resolution "FHD" to the display device 10, and the display controller 120 may display the contents having the resolution "FHD" on the display unit 110 using the contents data CD received.

In another embodiment, the contents controller 210 may change the resolution of the contents data CD to be close to the resolution corresponding to the resolution control signal DR. Then, the display controller 120 of the display device 10 may further change the resolution of the contents data CD to be the same as the resolution corresponding to the resolution control signal DR.

Hereinafter, operations of the contents controller 210 are explained for an exemplary cases where the resolution of the original contents data CD is "4K" (4096×2160).

In the case where the resolution required in the current display device 10 is "FHD" (1920×1080), the display controller 120 may transmit the resolution control signal DR that includes the resolution information related to "FHD" to the contents providing device 20 to notify that the currently required resolution is "FHD".

The contents controller 210 that received the resolution control signal DR may change the resolution of the contents data CD from "4K" to "UHD" (3840×2160) so that the resolution of the contents data CD becomes close to "FHD" (1920×1080) that is the resolution indicated by the resolution control signal DR. Accordingly, the size of the contents data CD may be reduced.

Then, the contents controller 210 may transmit the contents data CD having the resolution "UHD" to the display device 10.

The display controller 120 of the display device 10 may further change the resolution of the received contents data CD from "UHD" to "FHD", and eventually display, on the display unit 110, the contents having the resolution "FHD" using the contents data CD.

The communication unit 220 may be connected to the wireless network 30 to receive data (e.g., the resolution control signal DR) from the display device 10 or transmit data (e.g., contents data CD) to the display device 10.

The communication unit 130 of the display device 10 and the communication unit 220 of the contents providing device 20 may transceive data via wireless communication over the network 30.

For example, both communication units 130 and 220 may use a mobile communication method, wireless communication technology, and short-distance communication method, etc.

Examples of the mobile communication method that may be used herein include, but are not limited to, Global System for Mobile communication (GSM), Code Division Multi Access (CDMA), Code Division Multi Access 2000 (CDMA2000), Enhanced Voice-Data Optimized or Enhanced Voice-Data Only (EVDO), Wideband CDMA (WCDMA), High Speed Downlink Packet Access (HS-DPA), High Speed Uplink Packet Access (HSUPA), Long Term Evolution (LTE), and Long Term Evolution-Advanced (LTE-A).

Examples of the wireless communication technology that may be used herein include, but are not limited to, Wireless LAN (WLAN), Wireless-Fidelity (Wi-Fi), Wi-Fi Direct, Digital Living Network Alliance (DNLA), Wireless Broadband (WiBro), and World Interoperability for Microwave Access (WiMAX).

Examples of the short-distance communication method that may be used herein include, but are not limited to, Bluetooth, Radio Frequency Identification (RFID), Infrared Data Association (IrDA), Ultra Wideband (UWB), ZigBee, Near Field Communication (NFC), and Wireless Universal Serial Bus (USB).

Figure 4:
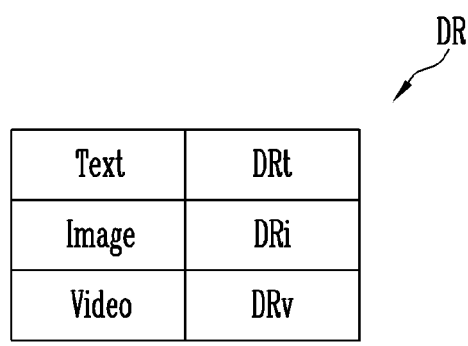
FIG. 4 is a view illustrating a resolution control signal, according to an embodiment of the present disclosure.

FIG. 4 is a view illustrating a resolution control signal, according to an embodiment of the present disclosure.

Referring to FIG. 4, the resolution control signal DR may include a text resolution information DRt, image resolution information DRi, and video resolution information DRv.

Actual contents may include various types of contents such as a text, an image and a video, and the resolution required in the display device 10 may vary depending on the type of the contents.

Accordingly, as illustrated in FIG. 4, each of the resolution information DRt, DRi, DRv may be set according to the types of contents including the text, the image and the video.

In this case, the display controller 120 may transmit the resolution control signal DR that includes a preset text resolution information DRt, a preset image resolution information DRi, and a preset video resolution information Dry to the contents providing device 20.

For example, the text resolution information DRt, the image resolution information DRi, and the video resolution information DRv may be set differently from one another.

The contents providing device 20 may change the resolution of the contents data CD in response to the received resolution information DRt, DRi, and DRv.

For example, the contents data CD may include text data for displaying a text, image data for displaying an image, and video data for displaying a video.

Accordingly, the contents controller 210 may change the resolution of the text data in response to the text resolution information DRt, change the resolution of the image data in response to the image resolution information DRi, and change the resolution of the video data in response to the video resolution information DRv.

Here, the contents controller 210 may change the resolution of the text data, the resolution of the image data, and the resolution of the video data to be the same as the text resolution information DRt, the image resolution information DRi, and the video resolution information DRv, respectively.

Further, the contents controller 210 may perform a primary operation for changing the resolution of the text data, the image data, and the video data to be close to the text resolution information DRt, the image resolution DRi, and the video resolution information DRv.

Then, the contents controller 210 may perform a secondary operation for changing the resolution of the text data, the image data, and the video data to be the same as the text resolution information DRt, the image resolution information DRi, and the video resolution information DRv.

FIGS. 5A to 5D illustrate a contents displaying operation of a display device, according to an embodiment of the present disclosure.

In particular, FIGS. 5A to 5D illustrate each of the contents that may be displayed in the contents display area AA of the display unit 110.

Figure 5A:
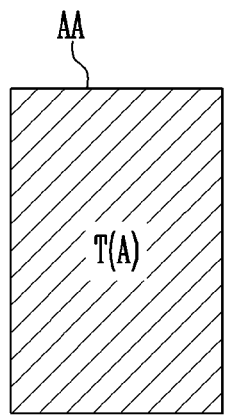
FIGS. 5A to 5D illustrate a contents display operation of a display device, according to an embodiment of the present disclosure.
Figure 5B:
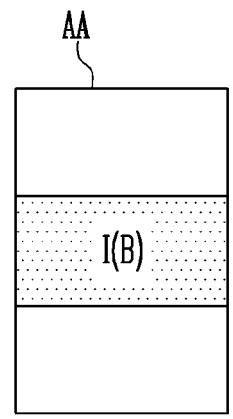
Figure 5C:
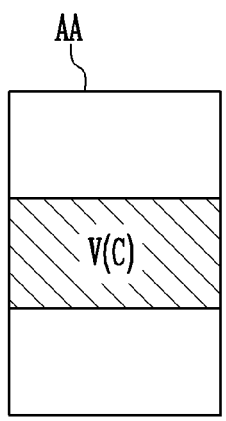
Figure 5D:
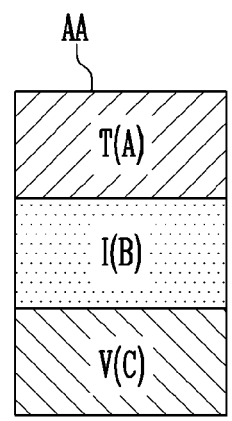

Further, FIG. 5A illustrates an example case where a text T is displayed in the contents display area AA, FIG. 5B illustrates an example case where an image I is displayed in the contents display area AA, FIG. 5C illustrates an example case where video V is displayed in the contents display area AA, and FIG. 5D illustrates an example case where the text T, the image I, and the video V are displayed together in the contents display area AA.

Hereinafter, contents display operations of the display device 10 are explained for an exemplary cases where the text resolution information DRt, the image resolution information DRi, and the video resolution information DRv are "A", "B", and "C", respectively.

In the case where the contents controller 210 changed the resolution of the text data to be the same as the text resolution information DRt, the text data has the resolution "A".

Accordingly, the display controller 120 of the display device 10 may receive text data having the resolution "A" from the contents providing device 20, and display the text T of the resolution "A" on the contents display area AA of the display unit 110 using the text data as shown in FIG. 5A.

In the case where the contents controller 210 changed the resolution of the image data to be the same as the image resolution information DRi, the image data has the resolution "B".

Accordingly, the display controller 120 may receive the image data having the resolution "B" from the contents providing device 20, and display the image I of the resolution "B" on the contents display area AA of the display unit 110 using the image data as shown in FIG. 5B.

In the case where the contents controller 210 changed the resolution of the video data to be the same as the video resolution information DRv, the video data has the resolution "C".

Accordingly, the display controller 120 may receive the video data having the resolution "C" from the contents providing device 20, and display the video V of the resolution "C" on the contents display area AA of the display unit 110 using the video data as shown in FIG. 5C.

In an example case where certain contents include the text T, the image I, and the video V, the contents controller 210 may change the resolution of the text data, the resolution of the image data, and the resolution of the video data to be the same as the text resolution information DRt, the image resolution information DRi, and the video resolution information DRv, respectively.

In this case, the resolution of the text data, the resolution of the image data, and the resolution of the video data have the resolution "A", the resolution "B", and the resolution "C", respectively.

Accordingly, the display controller 120 may receive the text data, the image data, and the video data from the contents providing device 20, and display the text T of the resolution "A", the image I of the resolution "B", and the video V of the resolution "C" on the contents display area AA of the display unit 110 using the received text data, image data, and video data as shown in FIG. 5D.

Although FIG. 5D exemplifies the contents that include all of the text T, the image I, and the video V, contents that include the text T and the image I, contents that include the text T and the video V, and contents that include the image I and the video V may also be displayed in the contents display area AA in a similar manner.

Figure 6:
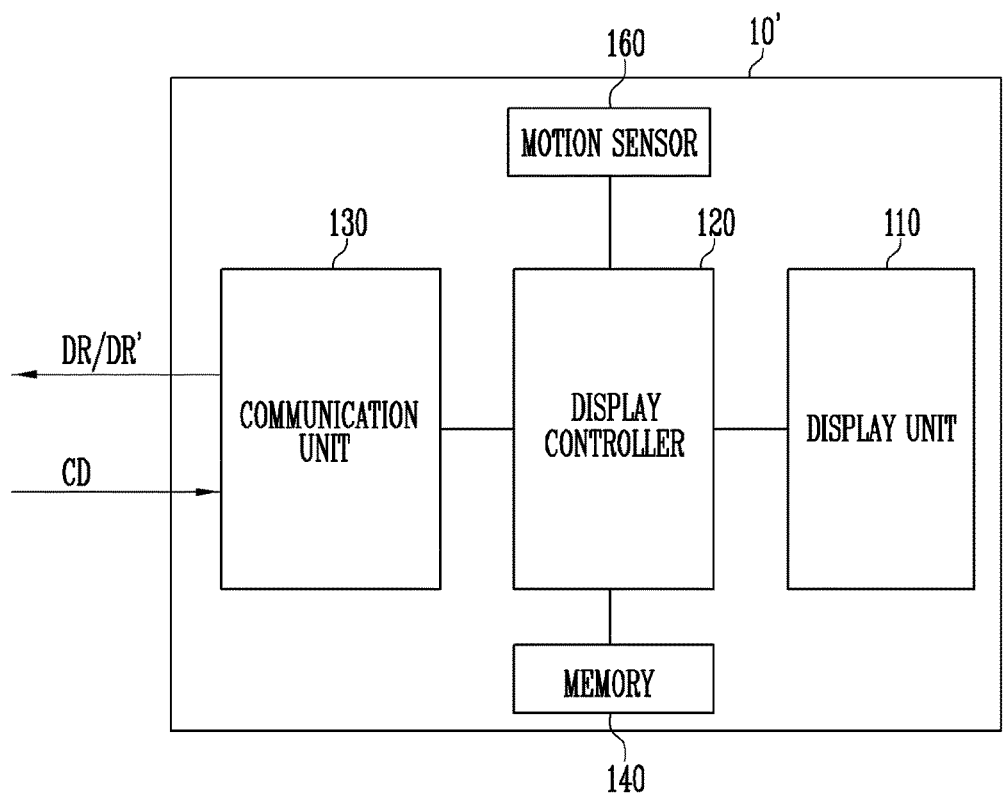
FIG. 6 is a view illustrating a display device, according to another embodiment of the present disclosure.

FIG. 6 is a view illustrating the display device, according to another embodiment of the present disclosure.

Referring to FIG. 6, the display device 10' may include a display unit 110, a display controller 120, a communication unit 130, a memory 140, and a motion sensor 160.

Hereinafter, the description of the display device 10' is made with an emphasis on differences from the aforementioned embodiments. Like reference numerals refer to like elements. Further, regarding portions not explained hereinafter, the aforementioned embodiments may apply.

In an example case where the display controller 120 senses a change in a contents use environment using the motion sensor 160, the display controller 120 may transmit a new resolution control signal DR' that includes the resolution information corresponding to the current contents use environment to the contents providing device 20.

For example, the contents use environment may include a display mode of the display device 10'. That is, the contents controller 210 may sense a change in the display mode using the motion sensor 160, and transmit a new resolution control signal DR' corresponding to the current display mode to the contents providing device 20.

The motion sensor 160 can sense motions of the display device 10'. In some embodiments, the motion sensor 160 may sense changes in the display mode.

For example, the motion sensor 160 may include at least one of a gyro sensor, an acceleration sensor, and a gravity sensor.

Figure 7:
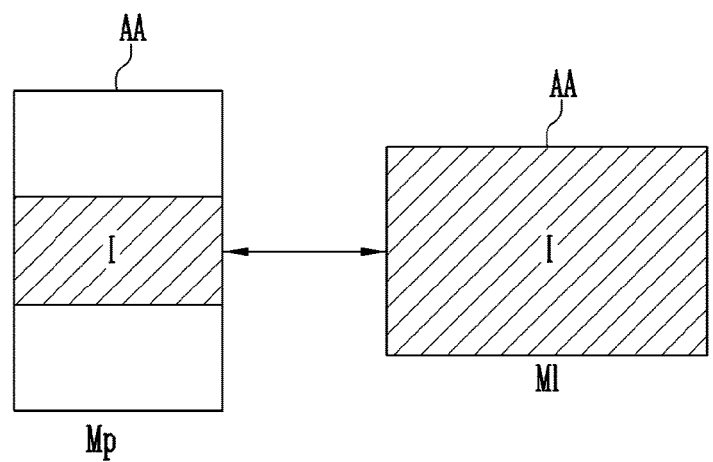
FIG. 7 is a view illustrating a display mode, according to an embodiment of the present disclosure.
Figure 8:
FIG. 8 is a view illustrating a resolution contron signal, according to another embodiment of the present disclosure.

FIG. 7 is a view illustrating a display mode, according to an embodiment of the present disclosure, and FIG. 8 is a view illustrating a resolution control signal, according to another embodiment of the present disclosure.

Referring to FIG. 7, the display device 10' may include two types of display modes.

For example, the display mode may include a portrait display mode Mp in which contents are displayed vertically, and a landscape display mode Ml in which contents are displayed horizontally.

According to the display mode Mp and Ml, the resolution of the contents displayed in the display device 10' may be set differently.

This is because the size of the contents that may be displayed in the portrait display mode Mp and the size of the contents that may be displayed in landscape display mode Ml are different from each other.

For this purpose, as illustrated in FIGS. 6 and 8, the resolution information included in the resolution control signal DR (and DR') may be set differently for the portrait display mode Mp and the landscape display mode Ml.

For example, the text resolution information DRt may include text resolution information for the portrait display DRtp and the landscape display DRtl, the image resolution information DRi may include image resolution information for the portrait display DRip and the landscape display DRil, and the video resolution information DRv may include video resolution information for the portrait display DRvp and the landscape display DRvl.

The display controller 120 may sense the portrait display mode Mp and the landscape display mode Ml using the motion sensor 160.

That is, when the user places the display device 10' in a portrait direction, the motion sensor 160 may sense that the display device 10' is placed in the portrait direction, in which case the display controller 120 may enter the portrait display mode Mp.

In another embodiment, even when the location of the display device 10' is not changed, the display controller 120 may enter the portrait display mode Mp in response to a user's input.

When the display controller 120 enters the portrait display mode Mp, the display controller 120 may display the contents to be suitable to the contents display area AA that is placed vertically, and may transmit a resolution control signal that includes the text resolution information for portrait display DRtp, the image resolution information for portrait display DRip, and the video resolution information for portrait display DRvp to the contents providing device 20.

Meanwhile, when the user places the display device 10' in a landscape direction, the motion sensor 160 may sense that the display device 10' is placed in the landscape direction, in which case the display controller 120 may enter the landscape display mode Ml.

In another embodiment, even when the location of the display device 10' is not changed, the display controller 120 may enter the landscape display mode Ml in response to a user's input.

When the display controller 120 enters the landscape display mode Ml, the display controller 120 may display contents to be suitable to the contents display area AA placed in the landscape direction, and may transmit the resolution control signal DR that includes the text resolution information for landscape display DRtl, the image resolution information for landscape display DRil, and the video resolution information for landscape display DRvl to the contents providing device 20.

Hereinafter, operations of the display device 10' and the contents providing device 20 are explained for an exemplary cases where an initial display mode is the portrait display mode Mp.

Since the current display mode is the portrait display mode Mp, the display controller 120 may transmit the resolution control signal DR that includes the preset resolution information to the contents providing device 20.

Here, the preset resolution information may include the text resolution information for the portrait display DRtp, the image resolution information for the portrait display Drip, and the video resolution information for the portrait display DRvp.

The contents controller 210 may change the resolution of the contents data CD in response to the resolution control signal DR received, and transmit the contents data CD to the display device 10'.

Here, the contents data CD may include text data, image data, and video data.

For example, the contents controller 210 may change the resolution of the text data in response to the text resolution information for the portrait display DRtp, change the resolution of the image data in response to the image resolution information for the portrait display DRip, and change the resolution of the video data in response to the video resolution information for the portrait display DRvp.

Further, the contents controller 210 may transmit the text data, the image data, and the video data to the display device 10'.

The display controller 120 may display the corresponding contents on the contents display area AA of the display unit 110 using the received text data, image data, and video data.

Then, the display controller 120 may continuously monitor the use environment (e.g., a display mode) of the display device 10'. When the display mode is changed to the landscape display mode Ml, the display controller 120 may transmit a new resolution control signal DR' that includes resolution information corresponding to the changed display mode (i.e., the landscape display mode Ml) to the contents providing device 20.

Here, the new resolution control signal DR' may include the text resolution information for the landscape display DRtl, the image resolution information for the landscape display DRil, and the video resolution information for the landscape display DRvl.

The contents controller 210 may change the resolution of the contents data CD in response to the received resolution control signal DR', and transmit the contents data CD to the display device 10'.

For example, the contents controller 210 may change the resolution of the text data in response to the text resolution information for the landscape display DRtl, change the resolution of the image data in response to the image resolution information for the landscape display DRil, and change the resolution of the video data in response to the video resolution information for the landscape display DRvl.

Further, the contents controller 210 may transmit the text data, the image data, and the video data to the display device 10'.

The display controller 120 may display the corresponding contents on the contents display area AA of the display unit 110 using the received text data, image data, and video data.

Meanwhile, the use environment that the display controller 120 monitors may include a best resolution mode.

The best resolution mode is a mode in which contents are displayed in the best resolution possible in the display device 10'. For example, the best resolution mode may be set to a virtual reality mode that requires a high resolution.

Entering the best resolution mode may be made in response to a user's input, or automatically when a device for providing a virtual reality (e.g., a head-mounted device) is identified.

When entered the best resolution mode, the display controller 120 may transmit a new resolution mode signal DR' that includes the best resolution information of the display device 10' to the contents providing device 20.

Accordingly, the contents providing device 20 may change the resolution of the contents data CD in response to the best resolution of the display device 10', and transmit the contents data CD to the display device 10'.

Therefore, the display device 10' may display the contents of the best resolution on the contents display area AA.

Meanwhile, the display controller 120 may monitor whether or not the resolution information is updated.

For example, a manual update of the resolution information by the user may be received while the display device 10' is being used.

Therefore, when the resolution information is updated to new resolution information according to a user's input, the display controller 120 may transmit a new resolution control signal DR' that includes the updated resolution information to the contents providing device 20.

Accordingly, the contents providing device 20 may change the resolution of the contents data CD in response to the updated resolution information, and transmit the contents data CD to the display device 10'.

Therefore, the display device 10' may display the contents having the updated resolution on the contents display area AA.

Figure 9:
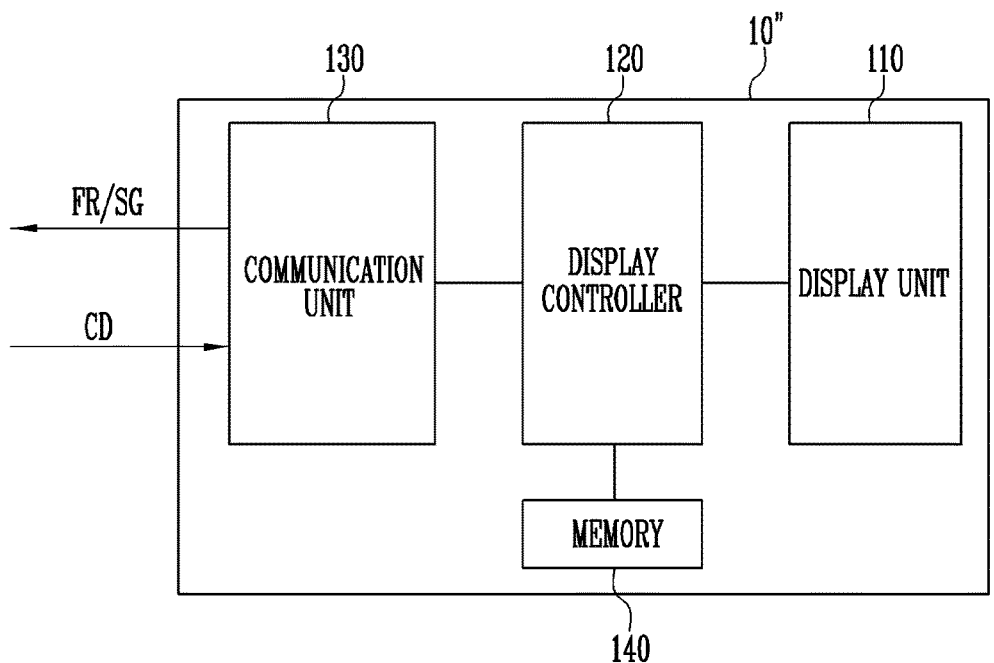
FIG. 9 is a view illustrating a display device, according to another embodiment of the present disclosure.

FIG. 9 is a view illustrating a display device, according to another embodiment of the present disclosure.

Referring to FIG. 9, the display device 10" may include a display unit 110, a display controller 120, a communication unit 130, and a memory 140.

Hereinafter, the description of the display device 10" is made with an emphasis on differences from the aforementioned embodiments. Like reference numerals refer to like elements. Further, regarding portions not explained hereinafter, the aforementioned embodiments may apply.

The display controller 120 may transmit information FR related to a frame rate of the contents (e.g., a video) required for the display device 10" to the contents providing device 20.

Accordingly, the contents controller 210 of the contents providing device 20 may change the frame rate of the contents data CD in response to the received frame rate information FR. The frame rate of the contentx data CD may be close but different from the frame rate identified by the information FR.

Here, the content data CD may include video data.

Further, the contents controller 210 may transmit the contents data CD with the changed frame rate to the display device 10".

The display controller 120 may display video contents having a preset frame rate on the contents display area AA using the received contents data CD. The preset frame rate may be the same as the frame rate the frame rate identified by the information FR. In other embodiments, the preset frame rate may be different from the frame rate of the contents data CD received from the contents providing device 20.

Meanwhile, the use environment that the display controller 120 monitors may include a low gray mode.

The low gray mode is a mode in which the size of the contents data CD is reduced by reducing the number of bits of gray data to be used in the display device 10".

Figure 10A:
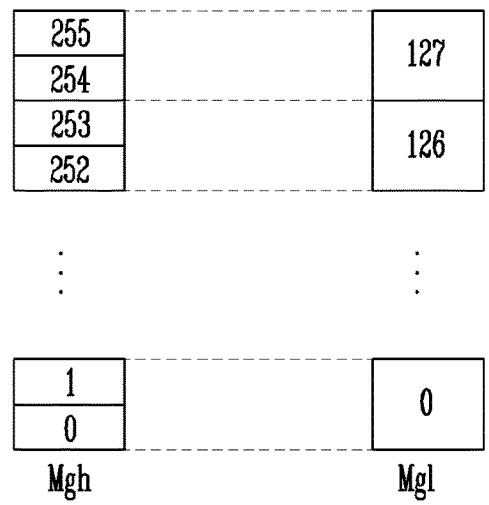
FIGS. 10A to 10B illustrate an operation in a low gray mode, according to an embodiment of the present disclosure.
Figure 10B:
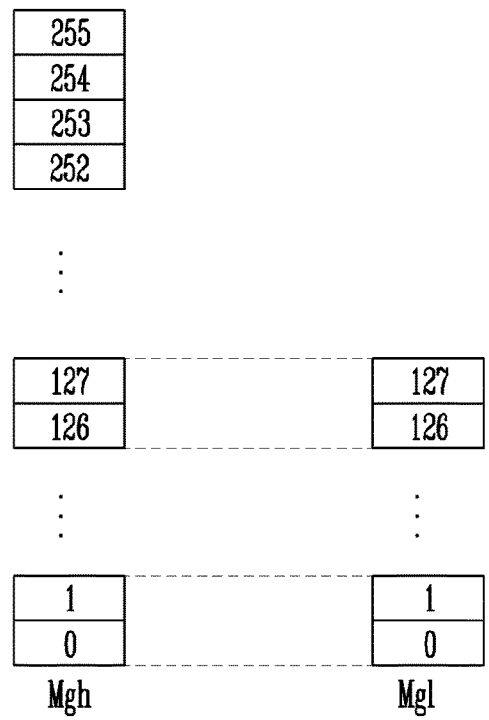

FIGS. 10A and 10B illustrate an operation in a low gray mode according to an embodiment of the present disclosure.

Hereinafter, operations of the display device 10" and the contents providing device 20 in the low gray mode Mgl are explained with reference to FIGS. 9, 10A, and 10B.

The low gray mode Mgl is a mode in which the number of bits of gray data being used is smaller than that of the current gray mode Mgh (e.g., a high gray mode).

For example, the number of bits of gray data of the current gray mode Mgh may be set to be 2n times the number of bits of gray data of the low gray mode Mgl. Here, n may be set to be a whole number of or above 1.

In particular, FIGS. 10A and 10B exemplify a case where the number of bits of gray data of the current gray mode Mgh is 256, and the number of bits of gray data of the low gray mode Mgl is 128.

The low gray mode Mgl may be performed in various ways. For example, referring to FIG. 10A, the low gray mode Mgl may be realized by integrating two adjacent gray data in the current gray mode Mgh into one gray in the low gray mode Mgl.

In another example, the low gray mode Mgl may be realized by using a subset of the gray data in the current gray mode Mgh (e.g., only 0~127 grays).

The gray data configured in 8 bit can be displayed in 256 bit gray data whereas the gray data configured in 7 bit can only be displayed in 128 bit gray data.

When entered in the low gray mode Mgl in response to a user's input, the display controller 120 may transmit a low gray mode signal SG to the contents providing device 20.

The contents controller 210 that receives the low gray mode signal SG may reduce the size of the contents data CD by reducing the number of bits of gray data included in the contents data CD.

For example, the contents controller 210 may convert the gray data configured in 8 bit into 7 bit gray data.

Figure 11:
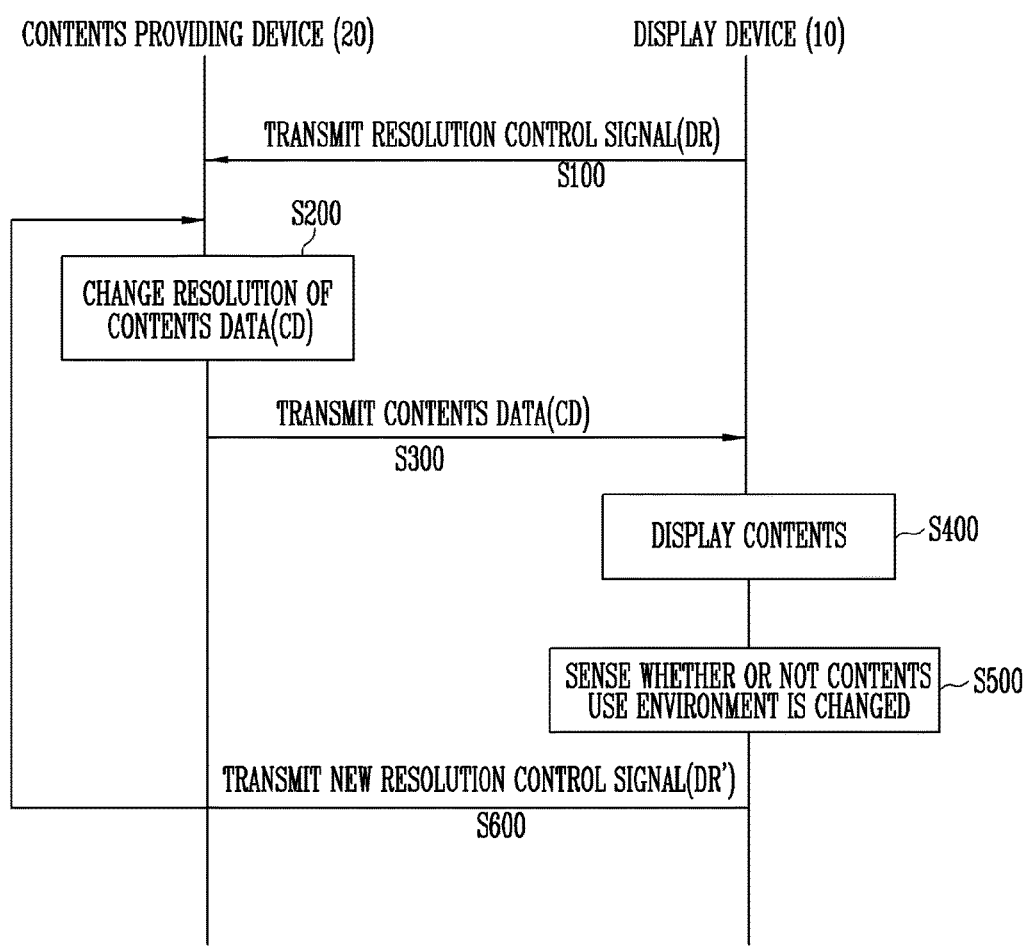
FIG. 11 is a view illustrating a contents display method, according to an embodiment of the present disclosure.

FIG. 11 is a view illustrating a contents display method, according to an embodiment of the present disclosure.

Referring to FIG. 11, a step of transmitting the resolution control signal DR to the contents providing device 20 by the display device 10 may be performed (S100).

For example, the resolution control signal DR may include the text resolution information DRt, the image resolution information DRi, and the video resolution information DRv as shown in FIG. 4.

Then, a step of changing, by the contents providing device 20, the resolution of the contents data CD in response to the resolution information received in the step S100 may be performed (S200).

In one embodiment, the contents providing device 20 may change the resolution of the contents data CD to be the same as the resolution information included in the resolution control signal DR.

For example, the contents data CD may include text data for displaying texts, image data for displaying images, and video data for displaying videos.

In this case, the contents providing device 20 may change the resolution of the text data, the resolution of the image data, and the resolution of the video data to be the same as the text resolution information DRt, the image resolution information DRi and the video resolution information DRv, respectively.

Further, a step of transmitting, by the contents providing device 20, the contents data CD of which the resolution is changed to the display device 10 may be performed (S300).

Then, a step of displaying, by the display device 10, the contents using the contents data CD may be performed (S400).

For example, the display device 10 may display the text having the resolution corresponding to the text resolution information DRt, the image having the resolution corresponding to the image resolution information DRi, and the video having the resolution corresponding to the video resolution information DRv using the text data, the image data, and the video data, respectively.

Further, a step of sensing whether or not the contents use environment is changed may be performed (S500).

If it is sensed that the contents use environment is changed, a step of transmitting a new resolution control signal DR' corresponding to the current contents use environment to the contents providing device 20 may be performed (S600).

When the contents providing device 20 receives the new resolution control signal DR', a step of changing the resolution of the contents data CD in response to the new resolution control signal DR' may be performed again (S200). Then, the aforementioned steps S300 and S400 may be performed in the same manner.

Figure 12A:
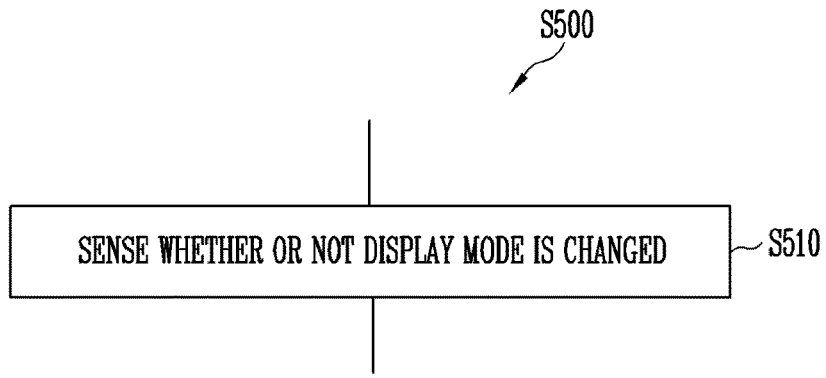
FIGS. 12A to 12C illustrate a step of sensing whether or not a contents use environment changed illustrated in FIG. 11.
Figure 12B:
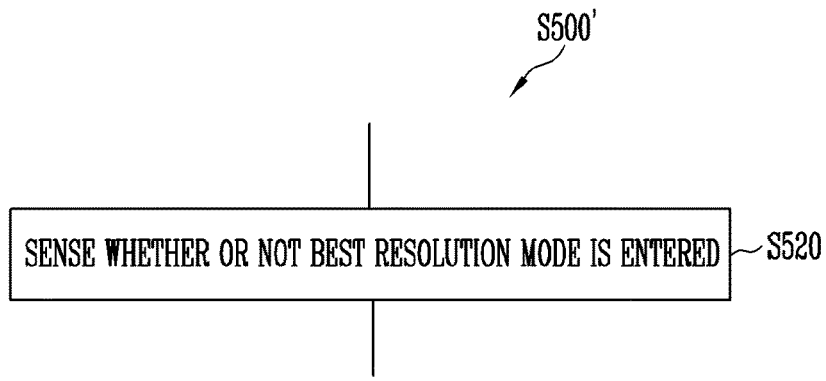
Figure 12C:
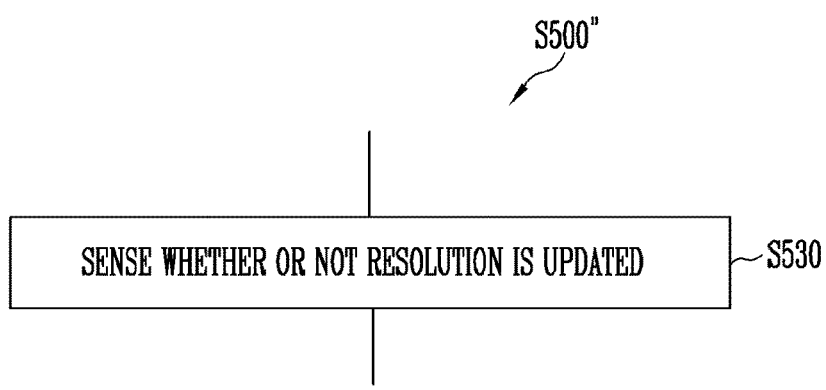

FIGS. 12A to 12C illustrate a step of sensing whether or not the contents use environment is changed as illustrated in FIG. 11.

Referring to FIG. 12A, the step S500 of sensing whether or not the contents use environment is changed may include a step of sensing whether or not the display mode of the display device 10 is changed (S510).

For example, the display mode may include the portrait display mode Mp in which contents are displayed vertically, and the landscape display mode Ml in which contents are displayed horizontally as shown in FIG. 7.

Further, a change of display mode may be sensed by the motion sensor 160 of the display device 10, or in response to a user's input.

When the display device 10 enters the portrait display mode Mp, at the step of transmitting the new resolution control signal DR' (S600), the text resolution information for the portrait display DRtp, the image resolution information for the portrait display DRip, and the video resolution information for the portrait display DRvp may be transmitted to the contents providing device 20.

In this case, at the following step of changing the resolution of the contents data CD (S200), the resolution of the text data may be changed in response to the text resolution information for the portrait display DRtp, the resolution of the image data may be changed in response to the image resolution information for the portrait display DRip, and the resolution of the video data may be changed in response to the video resolution information for the portrait display DRvp.

Further, at the following step of transmitting the contents data CD to the display device 10 (S300), the text data, the image data, and the video data may be transmitted to the display device 10.

At the following step of displaying contents (S400), the corresponding contents may be displayed in the contents display area AA of the display unit 110 in the portrait direction using the received text data, image data, and video data.

Further, when the display device 10 enters the landscape display mode Ml, at the step of transmitting a new resolution control signal DR' (S600), the text resolution information for the landscape display DRtl, the image resolution information for the landscape display DRil, and the video resolution information for the landscape display DRvl may be transmitted.

In this case, at the following step of changing the resolution of the contents data CD (S200), the resolution of the text data may be changed in response to the text resolution information for the landscape display DRtl, the resolution of the image data may be changed in response to the image resolution information for the landscape display DRil, and the resolution of the video data may be changed in response to the video resolution information for the landscape display DRvl.

Further, at the following step of transmitting the contents data CD to the display device 10 (S300), the text data, the image data, and the video data may be transmitted to the display device 10.

At the following step of displaying contents (S400), corresponding contents may be displayed in the contents display area AA of the display unit 110 in the landscape direction using the received text data, image data, and video data.

Referring to FIG. 12B, the step S500' of sensing whether or not the contents use environment is changed may include a step of sensing whether or not the display device 10 enters the best resolution mode (S520).

Entering the best resolution mode may be made manually in response to a user's input, or automatically in a certain environment (e.g., when a head-mount device is detected).

When the display device 10 enters the best resolution mode, at the step S600 of transmitting a new resolution control signal DR', a new resolution control signal DR' that includes information on the best resolution of the display device 10 may be transmitted. Then, the aforementioned steps S200-S400 may be performed in the same manner.

Referring to FIG. 12C, the step S500" of sensing whether or not the contents use environment is changed may include a step of sensing whether or not the resolution information is updated by the user (S530).

The resolution information may be updated to a new resolution information by a user's input.

Accordingly, when the resolution information is updated to a new resolution information, at the step S600 of transmitting a new resolution control signal DR', the new resolution control signal DR' that includes the updated resolution information may be transmitted to the contents providing device 20. Then, the aforementioned steps S200-S400 may be performed in the same manner.

Figure 13:
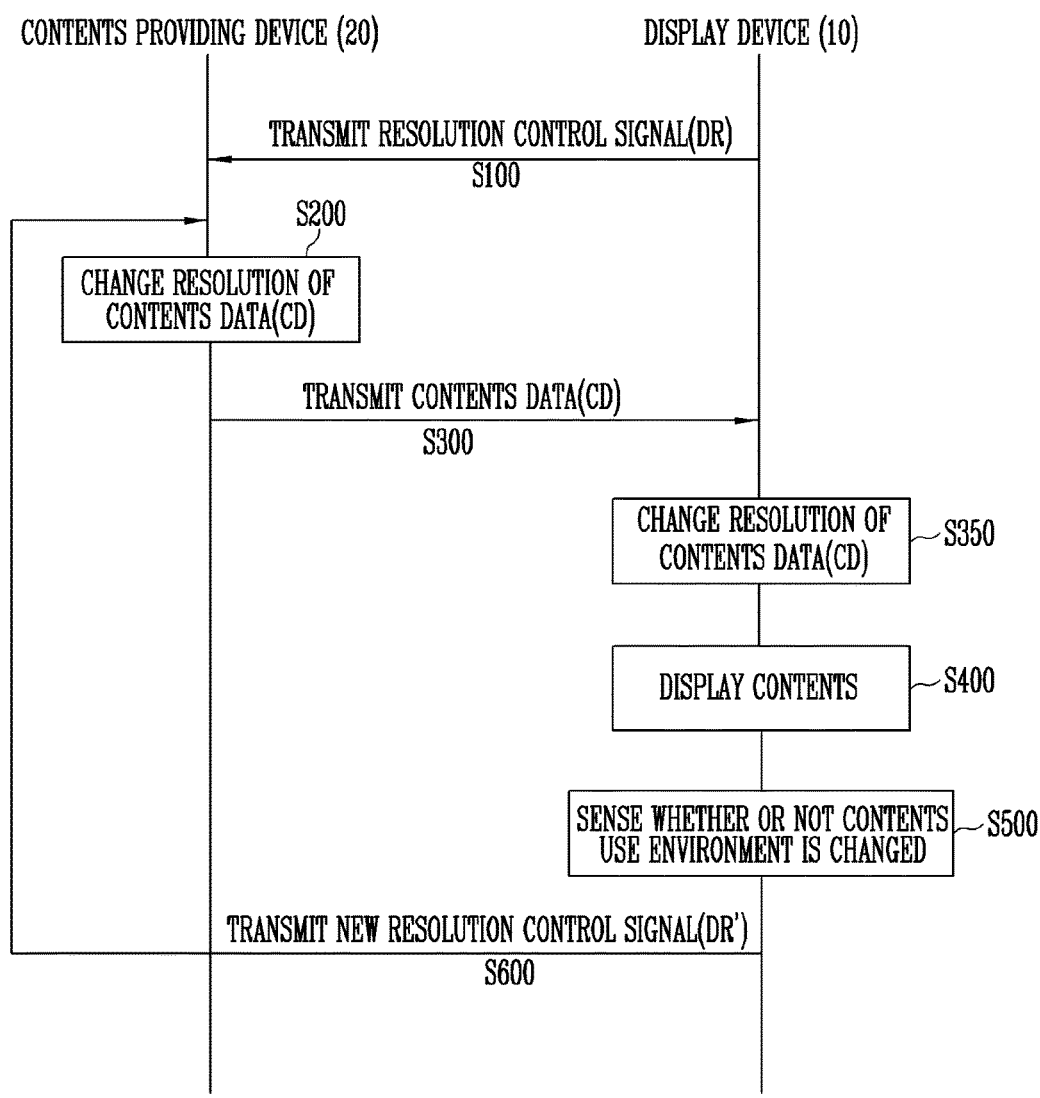
FIG. 13 illustrates a contents display method, according to another embodiment of the present disclosure.

FIG. 13 illustrates a contents display method, according to another embodiment of the present disclosure.

Hereinafter, the description of the contents display method is made with an emphasis on differences from the aforementioned embodiments. Like reference numerals refer to like elements. Further, regarding portions not explained hereinafter, the aforementioned embodiments may apply.

Referring to FIG. 13, the contents display method may further include a step of changing, by the display device 10, the resolution of the contents data CD (S350), in addition to the step S200 of the contents display method in the aforementioned embodiment.

For example, at the step S200 of changing, by the contents providing device 20, the resolution of the contents data CD, a primary change of the resolution of the contents data CD may be performed such that the resolution becomes close to the resolution information included in the resolution control signal DR.

The contents data CD may be transmitted to the display device 10 at the following step S300, and then at the step S350 of performing, by the display device 10, a secondary change of the resolution of the contents data CD may be performed such that the resolution corresponds to the resolution information included in the resolution control signal DR may be performed.

Thus, at the following step (S400), contents having the resolution corresponding to the resolution information may be displayed.

The example embodiments and drawings have been disclosed for illustrative purposes, but are not limited thereto, and those skilled in the art would appreciate that various modifications, additions, and substitutions are possible from the present disclosure in the art to which the present disclosure belongs.

The spirit of the present disclosure may be defined by the appended claims rather than by the description preceding them, and changes and modifications that fall within metes and bounds of the claims, or equivalents of such metes and bounds are therefore intended to be embraced by the range of the spirit of the present disclosure.

What is claimed is:

1. A contents display method comprising:
   transmitting, by a display device, a resolution control signal to a contents providing device;
   changing, by the contents providing device, a resolution of contents data in response to the resolution control signal and transmitting the contents data to the display device;
   displaying, by the display device, the contents using the contents data;
   sensing, by the display device, whether or not a contents use environment of the display device is changed; and
   when it is sensed that the contents use environment of the display device is changed, transmitting, by the display device, a new resolution control signal that includes resolution information corresponding to a current contents use environment to the contents providing device.

2. The contents display method according to claim 1, wherein the resolution control signal comprises text resolution information, image resolution information, and video resolution information.

3. The contents display method according to claim 2, wherein the contents data comprises at least one of text data, image data, and video data.

4. The contents display method according to claim 3, wherein the contents providing device changes a first resolution of the text data in response to the text resolution information, changes a second resolution of the image data in response to the image resolution information, and changes a third resolution of the video data in response to the video resolution information.

5. The contents display method according to claim 1, further comprising, when the contents providing device receives the new resolution control signal from the display device, changing the resolution of the contents data in response to the new resolution control signal, and transmitting the contents data to the display device.

6. The contents display method according to claim 1, wherein the step of sensing whether or not the contents use environment is changed comprises sensing whether or not a display mode of the display device is changed, and
   the display mode comprises a landscape display mode and a portrait display mode.

7. The contents display method according to claim 6, wherein the step of transmitting the new resolution control signal to the contents providing device comprises, when the display mode of the display device is changed, transmitting the new resolution control signal that includes resolution information corresponding to the current display mode to the contents providing device.

8. The contents display method according to claim 6, wherein the whether or not the display mode is changed is sensed by a motion sensor included in the display device.

9. The contents display method according to claim 8, wherein the motion sensor comprises at least one of a gyro sensor, an acceleration sensor, and a gravity sensor.

10. The contents display method according to claim 1,
wherein the step of sensing whether or not the contents use environment is changed comprises sensing whether or not the display device enters a best resolution mode, and the step of transmitting the new resolution control signal to the contents providing device comprises, when the display device enters the best resolution mode, transmitting the new resolution control signal comprising the best resolution information of the display device to the contents providing device, wherein the best resolution mode is a mode in which the contents are displayed in the best resolution possible in the display device.

11. The contents display method according to claim 1,
wherein the step of sensing whether or not the contents use environment is changed comprises sensing whether or not the resolution information is updated, and the step of transmitting the new resolution control signal to the contents providing device comprises, when the resolution information is updated, transmitting the new resolution control signal that includes the updated resolution information to the contents providing device.

12. The contents display method according to claim 1, wherein the contents providing device changes the resolution of the contents data to be the same as the resolution corresponding to the resolution control signal.

13. The contents display method according to claim 1,
wherein the contents providing device changes the resolution of the contents data to be close to the resolution corresponding to the resolution control signal, and the display device changes the resolution of the contents data to be the same as the resolution corresponding to the resolution control signal.

14. A contents display system comprising:
a contents providing device; and
a display device configured to transmit a resolution control signal to the contents providing device, wherein the contents providing device changes a resolution of contents data in response to the resolution control signal, and transmits the contents data to the display device, the display device displays the contents using the contents data, the display device senses whether or not a contents use environment of the display device is changed, and when it is sensed that the contents use environment of the display device is changed, the display device transmits a new resolution control signal that includes resolution information corresponding to a current contents use environment to the contents providing device.

15. The contents display system according to claim 14, wherein the resolution control signal comprises text resolution information, image resolution information, and video resolution information.

16. The contents display system according to claim 15, wherein the contents data comprises at least one of text data, image data, and video data.

17. A display device connected to a contents providing device via a network, the display device comprising:
a display unit that displays contents; and
a display controller that controls a contents display operation of the display unit, wherein the display controller transmits a resolution control signal to the contents providing device, and receives contents data in response to the resolution control signal from the contents providing device, wherein the display controller senses whether or not a contents use environment of the display unit is changed, and when it is sensed that the contents use environment of the display unit is changed, the display controller transmits a new resolution control signal that includes resolution information corresponding to a current contents use environment to the contents providing device.

18. The display device according to claim 17, wherein the resolution control signal comprises text resolution information, image resolution information, and video resolution information.

19. The display device according to claim 18, wherein the contents data comprises at least one of text data, image data, and video data.

* * * * *